United States Patent
Hubin et al.

(10) Patent No.: US 12,259,964 B2
(45) Date of Patent: Mar. 25, 2025

(54) SECURE EXECUTION OF SCRIPTS

(71) Applicant: GENETEC INC., Montréal (CA)

(72) Inventors: Mortimer Hubin, Laval (CA); Charles Desjardins, Québec (CA); Jean Bouchard, Québec (CA)

(*) Notice: Subject to any disclaimer, the term of this patent is extended or adjusted under 35 U.S.C. 154(b) by 391 days.

(21) Appl. No.: 17/512,402

(22) Filed: Oct. 27, 2021

(65) Prior Publication Data

US 2023/0130985 A1    Apr. 27, 2023

(51) Int. Cl.
G06F 21/54 (2013.01)
G06F 21/55 (2013.01)
G06F 21/56 (2013.01)
G06F 21/57 (2013.01)

(52) U.S. Cl.
CPC .......... G06F 21/54 (2013.01); G06F 21/554 (2013.01); G06F 21/566 (2013.01); G06F 21/577 (2013.01)

(58) Field of Classification Search
CPC ...... G06F 21/54; G06F 21/554; G06F 21/566; G06F 21/577; G06F 21/64; G06F 21/44
See application file for complete search history.

(56) References Cited

U.S. PATENT DOCUMENTS

| | | | |
|---|---|---|---|
| 6,598,161 B1 * | 7/2003 | Kluttz | G06F 21/6209 713/168 |
| 10,725,775 B2 * | 7/2020 | Suarez | G06F 8/63 |
| 10,831,892 B2 | 11/2020 | Johns | |
| 2003/0156719 A1 | 8/2003 | Cronce | |
| 2007/0226773 A1 | 9/2007 | Pouliot | |
| 2009/0187963 A1 | 7/2009 | Bori | |

(Continued)

FOREIGN PATENT DOCUMENTS

| | | | | |
|---|---|---|---|---|
| AU | 2021201689 A1 * | 4/2021 | ......... | G06K 7/10009 |
| CN | 101425114 A * | 5/2009 | | |
| EP | 3660714 A2 | 6/2020 | | |

OTHER PUBLICATIONS

Martin Woschek, OWASP Cheat Sheets, Apr. 9, 2015, Sections 5, 6, 12, 19, 24, 33 (Year: 2015).*

(Continued)

*Primary Examiner* — Carl G Colin
*Assistant Examiner* — Habibullah
(74) *Attorney, Agent, or Firm* — Anglehart et al.

(57) ABSTRACT

Method, systems, and computer-readable media for securely executing a script on a computer appliance are disclosed. A script payload is obtained from a requesting entity via an interface of the computer appliance, the script payload comprising the script and script security data. Multiple authentication factors for the script are obtained from the script security data, the multiple authentication factors comprising at least some nested authentication factors, wherein a first one of the authentication factors is encapsulated within a second one of the authentication factors. A first validation is performed to authenticate the script and the first authentication factor based on the second authentication factor and to generate a validated first authentication factor. A second validation is performed to authenticate the script based on the validated first authentication factor. Responsive to the script being authenticated by the first and second validations, the script is executed on the computer appliance.

36 Claims, 8 Drawing Sheets

(56) References Cited

U.S. PATENT DOCUMENTS

| | | |
|---|---|---|
| 2011/0238736 A1* | 9/2011 | Tanaka .................... H04L 67/14 |
| | | 709/203 |
| 2012/0272205 A1 | 10/2012 | Fox et al. |
| 2016/0180086 A1 | 6/2016 | Ladikov et al. |
| 2016/0182563 A1 | 6/2016 | Sambandam et al. |
| 2016/0275276 A1* | 9/2016 | Hovi ....................... G06F 21/31 |
| 2016/0294556 A1* | 10/2016 | Vortriede ................ H04L 9/321 |
| 2016/0308906 A1* | 10/2016 | Hasson ................. H04L 63/102 |
| 2017/0344743 A1 | 11/2017 | Shi et al. |
| 2018/0113746 A1* | 4/2018 | Mora López ............ G06N 3/00 |
| 2018/0131765 A1* | 5/2018 | Puleston ................. G11C 11/00 |
| 2018/0191738 A1* | 7/2018 | David .................... H04L 63/105 |
| 2018/0205554 A1* | 7/2018 | Blinn ................... H04L 9/3236 |
| 2018/0336554 A1* | 11/2018 | Trotter ................ H04L 63/0853 |
| 2019/0312733 A1* | 10/2019 | Engan ................... H04L 63/126 |
| 2020/0285761 A1 | 9/2020 | Buck et al. |
| 2020/0334032 A1* | 10/2020 | Smith ..................... G06F 21/64 |
| 2021/0029151 A1 | 1/2021 | Brooks |
| 2021/0191711 A1* | 6/2021 | Rusev ................... H04L 41/046 |
| 2021/0279326 A1* | 9/2021 | Adam ....................... H04L 9/30 |

OTHER PUBLICATIONS

Martin Woschek, OWASP Cheat Sheets, Apr. 9, 2015, Sections 5, 6, 12, 19, 24, 33 (Year: 2015) (Year: 2015).*

* cited by examiner

SECURE EXECUTION OF SCRIPTS

TECHNICAL FIELD

The present disclosure relates generally to computing devices, and more specifically to secure execution of scripts by computer appliances.

BACKGROUND

Computing devices are used for a wide variety of purposes and are deployed in a range of different scenarios. Some computing devices are designed to perform multiple different tasks based on user input and/or preprogramming, and some computing devices are designed to perform a limited range of tasks. One category of computing device is referred to using the term "computer appliance", which is generally provided to an operating party for implementing specific tasks or for providing specific resources as a closed or sealed system. Once deployed, the computer appliance may be used as provided, but may occasionally require intervention by the manufacturer, distributor, or other entity responsible for the computer appliance for maintenance or other operations.

The limited access provided to the operating party of the computer appliance may result in an inability to perform certain routine tasks without support or intervention from the responsible entity. This produces additional strain on the responsible entity to provide rapid responses to demands by the operating party. In some cases, the operating party may attempt to inappropriately access or modify the computer appliance, without the approval of the responsible entity, which may result in damage to the computer appliance.

As a result, there may be interest in facilitating the execution of certain tasks on a computer appliance.

SUMMARY

The following presents a simplified summary of one or more implementations in accordance with aspects of the present disclosure in order to provide a basic understanding of such implementations. Because computer appliances are often self-contained devices provided by a responsible entity for as-is use, the operating party which makes use of the computer appliance may not be provided with the requisite tools and/or authorization necessary for executing scripts on the computer appliance. The present disclosure provides an approach to allow scripts to be executed by a computer appliance by users other than those responsible for the operation of the computer appliance. The approach involves using multiple authentication factors, which may be digital signatures, certificates, or the like, to allow the computer appliance to authenticate the script itself prior to execution. Failure to authenticate the script results in the computer appliance refusing to execute the script, thereby securing the computer appliance. If the computer appliance can validate the script using the multiple digital signatures, then the computer appliance may execute the script, ensuring that the script is only executed when properly validated.

To reduce the risk of tampering, and to allow the script to authenticate the script, one or more of the authentication factors are used to authenticate some of the other authentication factors. This is done by encapsulating, or nesting, some of the authentication factors within others. For example, the script may first be digitally signed using an encryption key associated with the user who will deploy the script to the computer appliance, adding a first digital signature. Then, the script and the first digital signature are both digitally signed using an encryption key associated with an entity or system which provided the script. The script may then also be digitally signed using an encryption key associated with the computer appliance itself. This allows to computer appliance to validate both the script and one or more of the signatures using other ones of the signatures, that is to say, to validate that the signatures have not been tampered with.

The present disclosure describes, inter alia, methods, systems, devices, and computer-readable media for securely executing scripts on a computer appliance, and for producing scripts for secure execution, for example by a computer appliance. To ensure that a script is executed in a secure fashion by the computer appliance, script security data is included with the script as part of a script payload, which is obtained by the computer appliance. Multiple authentication factors for the script are included in the script security data, at least some of which are nested authentication factors. The authentication factors include an origin identifier, a requestor identifier, and a target appliance identifier, and a first one of the authentication factors is encapsulated within a second one of the authentication factors. As part of the secure execution of the script, a first validation is performed to authenticate the script and the first authentication factor based on the second authentication factor. The first validation generates a validated first authentication factor. A second validation is then performed to authenticate the script based on the validated first authentication factor. Once the script is authenticated by the first and second validations, the script is executed on the computer appliance.

To produce a script for secure execution, a request is obtained from a requesting entity, which may be a technician or other user seeking to obtain a script to be executed in a secure fashion. The request includes a requestor identifier and a target appliance identifier, which is indicative of a computer appliance on which the script is to be deployed. A script to be executed by the computer appliance is obtained with an origin identifier, which is indicative of the origin of the script. A first authentication factor for the script is generated based on one of the requestor identifier, the target appliance identifier, and the origin identifier. A second authentication factor for the script is then generated based on a different one of the requestor identifier, the target appliance identifier, and the origin identifier. The second authentication factor encapsulates the first authentication factor. A script payload is produced which includes the script and script security data, which is composed of at least the first and second authentication factors.

In accordance with a broad aspect, the present disclosure provides a method of securely executing a script on a computer appliance. The method comprises: obtaining a script payload from a requesting entity via an interface of the computer appliance, the script payload comprising the script and script security data; obtaining multiple authentication factors for the script from the script security data, the multiple authentication factors comprising at least some nested authentication factors and including an origin identifier, a requestor identifier associated with the requesting entity, and a target appliance identifier, wherein a first one of the authentication factors is encapsulated within a second one of the authentication factors; performing a first validation to authenticate the script and the first authentication factor based on the second authentication factor and to generate a validated first authentication factor; performing a second validation to authenticate the script based on the validated first authentication factor; and responsive to the script being authenticated by the first and second validations, executing the script on the computer appliance.

In at least some embodiments according to any one or more of the previous embodiments, said performing the first validation comprises authenticating the script based on any remaining unencapsulated authentication factors.

In at least some embodiments according to any one or more of the previous embodiments, said performing the second validation comprises authenticating the script based on any remaining unencapsulated authentication factors.

In at least some embodiments according to any one or more of the previous embodiments, said performing the first validation further authenticates an additional authentication factor, encapsulated within the second authentication factor, and generates a validated additional authentication factor, and wherein said performing the second validation further authenticates the script based on the validated additional authentication factor.

In at least some embodiments according to any one or more of the previous embodiments, the method comprises performing an additional validation to authenticate the script and the second authentication factor, encapsulated within a third one of the authentication factors, based on the third authentication factor and to generate a validated second authentication factor, wherein said performing the first validation is based on the validated second authentication factor.

In at least some embodiments according to any one or more of the previous embodiments, said performing the second validation further authenticates a third authentication factor, encapsulated within the first authentication factor, to generate a validated third authentication factor, and the method comprises performing an additional validation to authenticate the script based on the validated third authentication factor.

In at least some embodiments according to any one or more of the previous embodiments, said performing the second validation to authenticate the script is further based on an age of the script.

In at least some embodiments according to any one or more of the previous embodiments, said performing the second validation comprises determining whether the age of the script is within an allowable age range based on a timestamp associated with the script and obtained from the script security data.

In at least some embodiments according to any one or more of the previous embodiments, the method comprises determining a requesting time at which the script payload was obtained; and comparing the requesting time to a timestamp associated with the script and obtained from the script security data; wherein said performing the second validation to authenticate the script is further based on a delay duration between the requesting time and the timestamp.

In at least some embodiments according to any one or more of the previous embodiments, the method comprises: determining a requesting time at which the script payload was obtained; and determining whether the requesting time is within a maintenance time frame during which execution of the script is permitted; wherein said executing the script is performed responsive to the requesting time being within the maintenance time frame.

In at least some embodiments according to any one or more of the previous embodiments, said performing the first validation to authenticate of the script comprises: obtaining a digital signature indicative of the origin identifier; and validating the digital signature based on the second authentication factor to generate the validated first authentication factor.

In at least some embodiments according to any one or more of the previous embodiments, said performing the second validation comprises obtaining an authentication token associated with the requesting entity.

In at least some embodiments according to any one or more of the previous embodiments, the method comprises obtaining the authentication token via a media interface of the computer appliance.

In at least some embodiments according to any one or more of the previous embodiments, said performing the second validation comprises decrypting a portion of the script using an encryption key obtained from the script security data.

In at least some embodiments according to any one or more of the previous embodiments, said performing the second validation comprises decrypting a portion of the script using an encryption key previously obtained by the computer appliance.

In at least some embodiments according to any one or more of the previous embodiments, said performing the second validation comprises: determining a requestor class to which the requesting entity belongs; and determining whether the requestor class is authorized to request execution of the script.

In at least some embodiments according to any one or more of the previous embodiments, said determining whether the requestor class is authorized to request execution of the script comprises determining whether the requestor identifier is present in an authorized requestor class list obtained from the script security data.

In at least some embodiments according to any one or more of the previous embodiments, said determining whether the requestor class is authorized to request execution of the script comprises determining whether the requestor identifier is present in an authorized requestor class list previously obtained by the computer appliance.

In at least some embodiments according to any one or more of the previous embodiments, said performing the second validation to authenticate the script comprises determining whether an appliance identifier associated with the computer appliance corresponds to the target appliance identifier obtained from the script security data.

In at least some embodiments according to any one or more of the previous embodiments, said obtaining the multiple authentication factors comprises obtaining a list of target appliance identifiers, and wherein said performing the second validation to authenticate the script comprises determining whether an appliance identifier associated with the computer appliance is present in the list of target appliance identifiers.

In at least some embodiments according to any one or more of the previous embodiments, said performing the second validation to authenticate the script comprises: determining, based on the target appliance identifier, at least one approved appliance class for which execution of the script is authorized; and determining whether the computer appliance belongs to one of the at least one approved appliance class based on an appliance identifier associated with the computer appliance.

In at least some embodiments according to any one or more of the previous embodiments, said obtaining the script payload comprises obtaining the script payload over a network via a network interface of the computer appliance.

In at least some embodiments according to any one or more of the previous embodiments, said obtaining the script payload comprises obtaining the script payload from a removable media device couplable to the computer appliance via a media interface of the computer appliance.

In at least some embodiments according to any one or more of the previous embodiments, the method comprises, responsive to said executing the script on the computer appliance, storing a record of execution of the script within a database.

In at least some embodiments according to any one or more of the previous embodiments, said storing the record of execution of the script comprises storing a unique identifier associated with the script payload, and obtained from the script security data, in a cryptographic ledger accessible to the computer appliance.

In at least some embodiments according to any one or more of the previous embodiments, the method comprises performing an additional validation to authenticate the script by obtaining the unique identifier and determining whether the unique identifier is present in the cryptographic ledger.

In at least some embodiments according to any one or more of the previous embodiments, said storing the unique identifier associated with the script payload comprises accessing the cryptographic ledger over a network.

In accordance with another broad aspect, the present disclosure provides a system, comprising: a script source providing a script payload via an interface, the script payload comprising a script and script security data; and a computer appliance communicatively couplable to the script source to obtain the script payload therefrom via an interface of the computer appliance. The computer appliance is configured for: obtaining a script payload from a requesting entity via an interface of the computer appliance, the script payload comprising the script and script security data; obtaining multiple authentication factors for the script from the script and the script security data, the multiple authentication factors comprising at least some nested authentication factors and including an origin identifier, a requestor identifier associated with the requesting entity, and a target appliance identifier, wherein a first one of the authentication factors is encapsulated within a second one of the authentication factors; performing a first validation to authenticate the script and the first authentication factor based on the second authentication factor and to generate a validated first authentication factor; performing a second validation to authenticate the script based on the validated first authentication factor; and responsive to the script being authenticated by the first and second validations, executing the script on the computer appliance.

In accordance with a further broad aspect, the present disclosure provides a system, comprising: a processor; and a non-transitory computer-readable medium having stored thereon program instructions. The program instructions are executable by the processor for: obtaining a script payload from a requesting entity via an interface of the computer appliance, the script payload comprising the script and script security data; obtaining multiple authentication factors for the script from the script and the script security data, the multiple authentication factors comprising at least some nested authentication factors and including an origin identifier, a requestor identifier associated with the requesting entity, and a target appliance identifier, wherein a first one of the authentication factors is encapsulated within a second one of the authentication factors; performing a first validation to authenticate the script and the first authentication factor based on the second authentication factor and to generate a validated first authentication factor; performing a second validation to authenticate the script based on the validated first authentication factor; and responsive to the script being authenticated by the first and second validations, executing the script on the computer appliance.

In accordance with another broad aspect, the present disclosure provides a non-transitory computer-readable medium having stored thereon program instructions. The program instructions are executable by a processor which, when executed, cause the processor to perform: obtaining a script payload from a requesting entity via an interface of the computer appliance, the script payload comprising the script and script security data; obtaining multiple authentication factors for the script from the script and the script security data, the multiple authentication factors comprising at least some nested authentication factors and including an origin identifier, a requestor identifier associated with the requesting entity, and a target appliance identifier, wherein a first one of the authentication factors is encapsulated within a second one of the authentication factors; performing a first validation to authenticate the script and the first authentication factor based on the second authentication factor and to generate a validated first authentication factor; performing a second validation to authenticate the script based on the validated first authentication factor; and responsive to the script being authenticated by the first and second validations, executing the script on the computer appliance.

In accordance with a still further broad aspect, there is provided a method for producing scripts for secure execution, comprising: obtaining a request from a requesting entity, the request comprising a requestor identifier associated with the requesting entity and a target appliance identifier indicative of a computer appliance for deployment; obtaining a script for execution by the computer appliance and an origin identifier, indicative of an origin of the script, based on the request; generating a first authentication factor for the script based on a first one of the requestor identifier, the target appliance identifier, and the origin identifier; generating a second authentication factor for the script, encapsulating the first authentication factor, based on a second one of the requestor identifier, the target appliance identifier, and the origin identifier; and producing a script payload destined for the computer appliance, the script payload comprising the script and script security data composed of at least the first and second authentication factors.

In at least some embodiments according to any one or more of the previous embodiments, the method comprises generating an additional authentication factor for the script based on a remaining one of the requestor identifier, the target appliance identifier, and the origin identifier.

In at least some embodiments according to any one or more of the previous embodiments, the method comprises delivering the script payload to the computer appliance over a network via a network interface of the computer appliance.

In at least some embodiments according to any one or more of the previous embodiments, the method comprises deploying the script payload to a removable media device couplable to the computer appliance via a media interface thereof.

In at least some embodiments according to any one or more of the previous embodiments, the method comprises: assigning a unique identifier to the script payload; and storing the unique identifier in the script security data.

In at least some embodiments according to any one or more of the previous embodiments, the method comprises storing the unique identifier in one of a database, a cryptographic ledger, and a distributed ledger.

In at least some embodiments according to any one or more of the previous embodiments, said obtaining the request from the requesting entity comprises obtaining a cryptographic key associated with the requesting entity based on the requestor identifier.

In at least some embodiments according to any one or more of the previous embodiments, said obtaining the cryptographic key associated with the requesting entity comprises obtaining the cryptographic key from a hardware authentication device associated with the requesting entity.

In at least some embodiments according to any one or more of the previous embodiments, said obtaining the request from the requesting entity comprises obtaining a cryptographic key associated with the computer appliance for deployment based on the target appliance identifier.

In at least some embodiments according to any one or more of the previous embodiments, said obtaining the script for execution by the computer appliance comprises obtaining the script from a remote server.

In at least some embodiments according to any one or more of the previous embodiments, said obtaining the origin identifier comprises obtaining a cryptographic key associated with the origin of the script based on the origin identifier.

In at least some embodiments according to any one or more of the previous embodiments, said producing the script payload further comprises including a timestamp indicative of a time at which the script payload was produced.

In accordance with another broad aspect, the present disclosure provides a system. The system comprises: a processor and a non-transitory computer-readable medium having stored thereon program instructions. The program instructions are executable by the processor for: obtaining a request from a requesting entity, the request comprising a requestor identifier associated with the requesting entity and a target appliance identifier indicative of a computer appliance for deployment; obtaining a script for execution by the computer appliance and an origin identifier, indicative of an origin of the script, based on the request; generating a first authentication factor for the script based on a first one of the requestor identifier, the target appliance identifier, and the origin identifier; generating a second authentication factor for the script, encapsulating the first authentication factor, based on a second one of the requestor identifier, the target appliance identifier, and the origin identifier; and producing a script payload destined for the computer appliance, the script payload comprising the script and script security data composed of at least the first and second authentication factors.

In accordance with a further broad aspect, the present disclosure provides a non-transitory computer-readable medium having stored thereon program instructions. The program instructions are executable by a processor which, when executed, cause the processor to perform: obtaining a request from a requesting entity, the request comprising a requestor identifier associated with the requesting entity and a target appliance identifier indicative of a computer appliance for deployment; obtaining a script for execution by the computer appliance and an origin identifier, indicative of an origin of the script, based on the request; generating a first authentication factor for the script based on a first one of the requestor identifier, the target appliance identifier, and the origin identifier; generating a second authentication factor for the script, encapsulating the first authentication factor, based on a second one of the requestor identifier, the target appliance identifier, and the origin identifier; and producing a script payload destined for the computer appliance, the script payload comprising the script and script security data composed of at least the first and second authentication factors.

BRIEF DESCRIPTION OF THE DRAWINGS

For a more complete understanding of the present disclosure, reference is now made to the accompanying drawings. The following brief descriptions of the drawings should not be considered limiting in any fashion.

It will be noted that throughout the appended drawings, like features are identified by like reference numerals.

DETAILED DESCRIPTION

The present disclosure relates to the secure execution of scripts. The term "script" is commonly understood to mean a particular type of computer program that causes a computing device to automate certain tasks or operations. Although in certain embodiments a script may be executed by a runtime system or environment, the present disclosure should not be understood as being limited to such embodiments. Indeed, the present disclosure contemplates that "scripts" may refer to any suitable type of computer program or other software that may be executed by the computing device.

Figure 1:
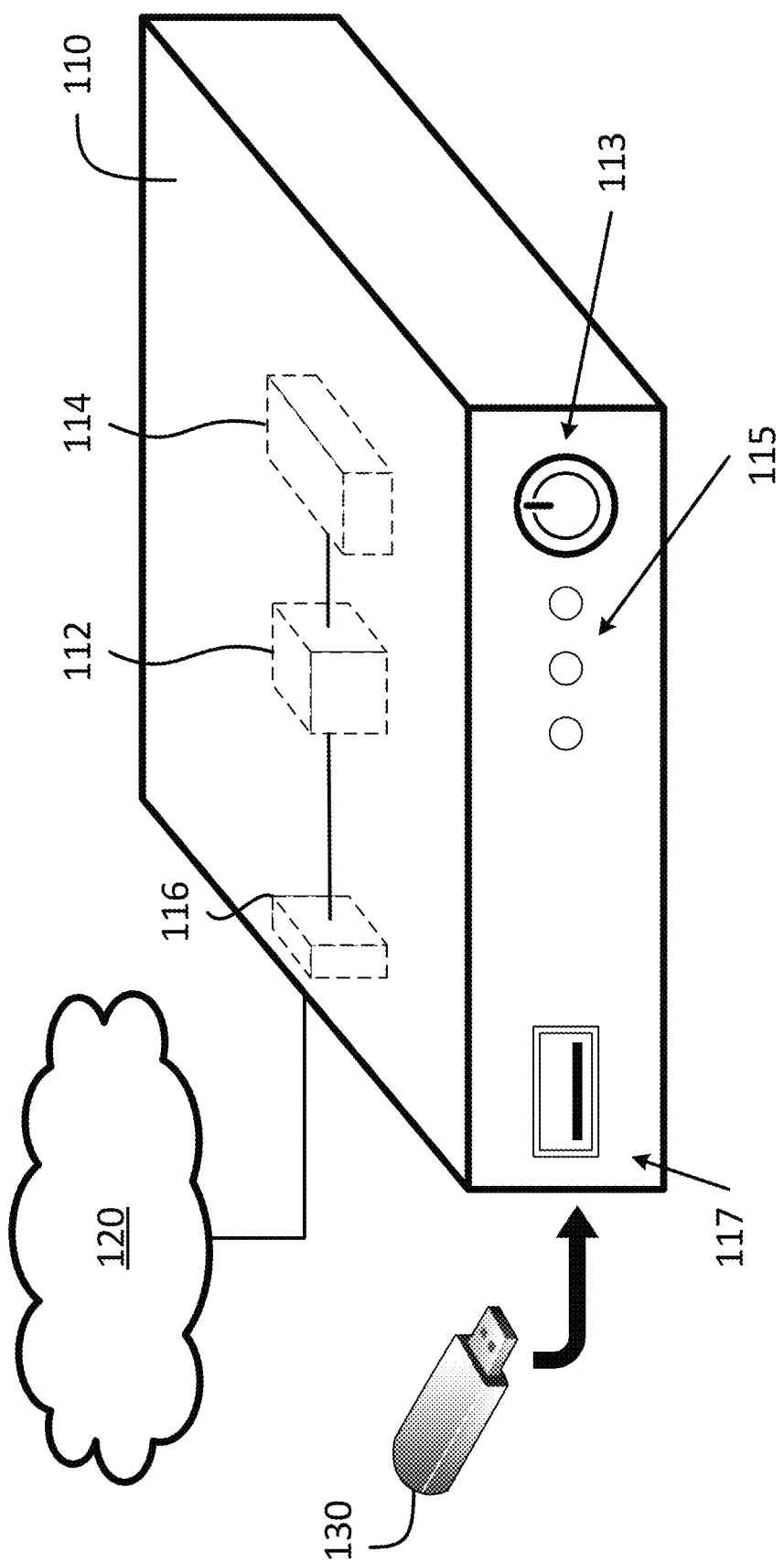
FIG. 1 is a schematic diagram of an example computer appliance.

Many varieties of computing devices exist. With reference to FIG. 1, one such example is what is commonly termed a computer appliance, illustrated at 110. Computer appliances are generally self-contained devices providing their own physical computing resources, which may include a processor 112, one or more memories 114, and one or more networking interfaces 116, which may be coupled together in any suitable fashion to permit the operation of the computer appliance 110. The computer appliance 110 may be connected to one or more networks 120 via the networking interface 116, which may include one or more internal networks (e.g., an intranet), one or more external networks (e.g., the Internet), or any suitable combination thereof. In some embodiments, the computer appliance 110 may include a casing or other container within which the physical computing resources of the computer appliance are contained. In the illustrated embodiment of FIG. 1, the computer appliance 110 also includes one or more interactive elements, such as a power button 113, and one or more indicators 115. The power button 113 may allow an operator to selectively place the computer appliance in an on or off state, and the indicators 115 may include, for instance, status lights to indicate various information about the operating state of the computing device 110. In some embodiments, in addition to the network interface 116, the computer appliance 110 may include one or more media interfaces 117 via which removable media, for instance a USB drive 130, may be coupled to the computer appliance 110.

Computer appliances, such as the computer appliance 110, are typically deployed for a particular task or purpose. By way of an example, the computer appliance 110 may be deployed to manage a group of access control devices coupled to the computer appliance 110: the access control devices may include access card readers, electronic locks, door controllers, and the like, each of which is coupled to the computer appliance 110. The computer appliance 110 may then control the access control devices, monitor the operation of the access control devices, and/or report information about the operation of the access control devices to a server or other system, for instance via the network 120. In other settings, the computer appliance 110 may be used to manage a data repository, to manage networks, network security, firewalls, and the like; other use cases for computer appliances are also considered. Additionally, it should be understood that although the present disclosure primarily describes embodiments relating to computer appliances, for example the computer appliance 110, the methods, systems, and other aspects of the present disclosure may relate to other types of computing devices.

Servicing and inspection activities may be performed on the computer appliance 110 in response to identifying abnormal behaviour, at specified times (e.g., scheduled maintenance), or in response to certain events (e.g., a firmware update becoming available). To facilitate, and in some cases automate, these types of servicing and inspection activities, task-specific scripts may be produced for execution by the computer appliance 110. By way of an example, a first script may cause the computer appliance 110 to compile records of previous actions performed by the computer appliance 110 and cause the records to be transmitted via the network 120 or to be stored on the USB drive 130. By way of another example, a second script may cause the computer appliance 110 to reboot and reinitialize the settings of the computer appliance 110. By way of a further example, a third script may cause the computer appliance 110 to retrieve a firmware or software update, for instance via the network 120, and to install the update (e.g., to the memory 114).

In some scenarios, the entity responsible for servicing and inspection activities may be different from the party which operates the computer appliance 110; as a result, the responsible entity may need to deploy personnel to the site where the computer appliance 110 is deployed, resulting in increased personnel and travel costs for the responsible entity, and increased delays for the party operating the computer appliance 110. While devolving certain servicing and inspection responsibilities to the operating party may alleviate the increased costs and delays, the responsible entity may wish to ensure that the operating party is performing the servicing and inspection activities in a secure manner. The present disclosure provides, inter alio, methods, systems, devices, and computer-readable media for secure execution of scripts which may serve to secure the devolution of servicing and inspection activities to the operating party. By ensuring that the operating party is provided with scripts that may be securely executed by the computer appliance 110, the responsible entity can safely hand off certain tasks to the party operating the computer appliance 110.

Figure 2:
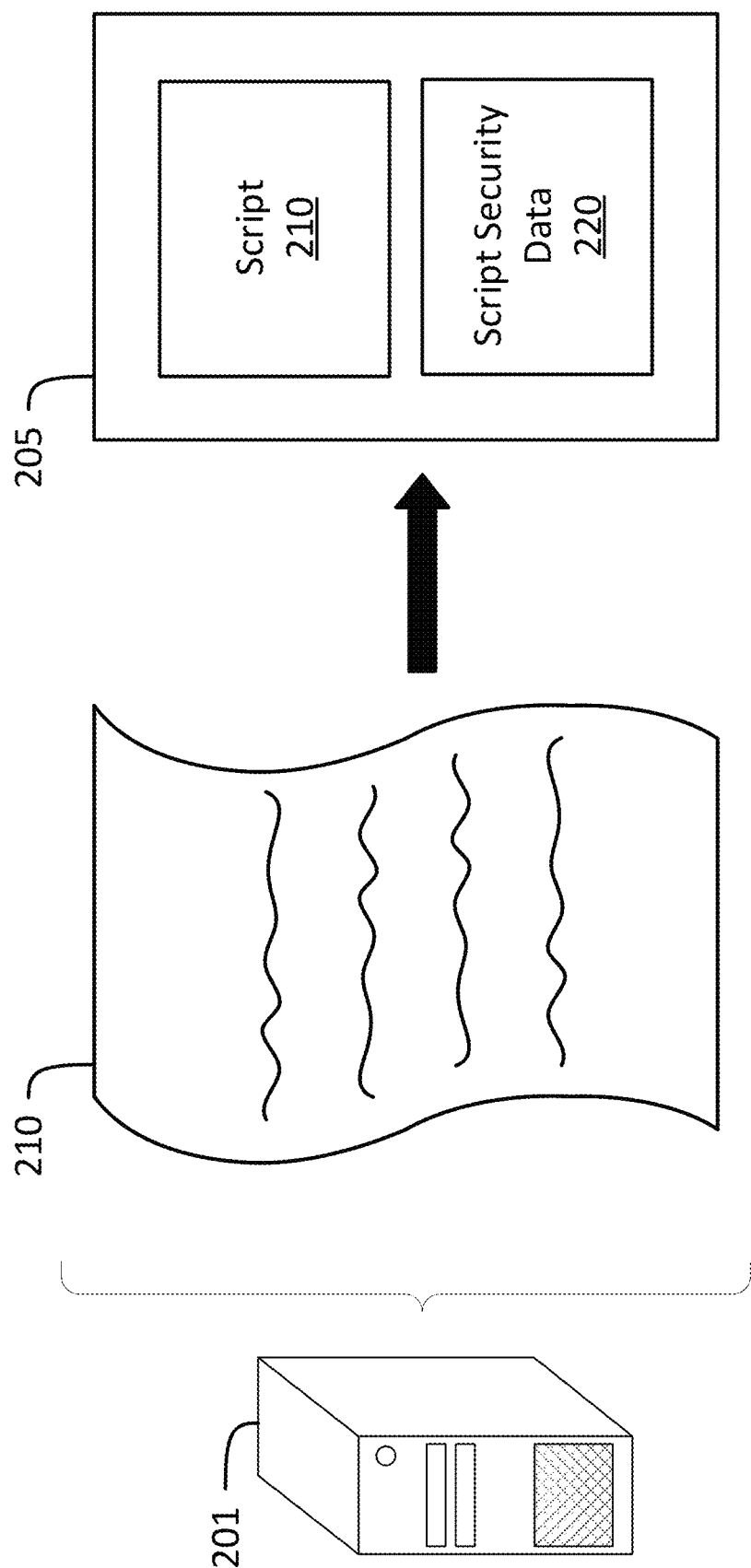
FIG. 2 is a schematic diagram of an example script and script payload.

With reference to FIG. 2, a script 210 for execution, for example by the computer appliance 110, is combined with script security data 220 to produce a script payload 205, which serves as a delivery mechanism for the script 210. Put differently, the script 210 is provided to the computer appliance 110 as part of the script payload 205, so that, inter alio, the script security data 220 may be provided concurrently with the script 210. The script payload 205 may be produced by any suitable entity; in some embodiments, the script payload 205 is produced a computing device 201 operated by the entity responsible for servicing and/or inspection activities relating to the computer appliance 110. In some cases, the computing device 201 may be operated by a manufacturer, distributor, or installer of the computer appliance 110. In some other cases, the computing device 201 may be operated by the same party which operates the computer appliance 110. The computing device 201 may run a program developed by the responsible entity which interfaces with, and in some cases manages, the computer appliances 110. In some other embodiments, the scripts 210 and/or script payloads 205 may have been previously produced, in whole or in part, by the responsible entity, and the computing device 201, or any other suitable computing device, can access the script 210 and/or the script payloads 205, for instance over the network 120.

The script payload 205 may package the script 210 and script security data 220 in any suitable fashion. For example, part or all of the script security data 220 may be included in the metadata of the script 210. The script payload 205 may be produced for a specific purpose, for instance to perform a particular servicing or inspection activity, and may be deployed to the computer appliance 110 in any suitable fashion. By way of some non-limiting examples, script payloads 205 may be produced for extracting records from the computer appliance 110, for reinitializing the computer appliance 110, for updating the computer appliance 110, for troubleshooting the computer appliance 110, and the like. The script 210 may be written in any suitable type of scripting language, may be included in the script payload 205 in a compiled or uncompiled state, and may include any suitable type of instructions for execution by the computer appliance 110. The script security data 220 may include multiple different types of information relating to the script 210 which serve to validate the script 210 and/or the script payload 205 prior to execution of the script 210 by the computing device 110. As will be described in greater detail hereinbelow, the script security data 220 may include information relating to the script 210 itself, the metadata of the script 210, other suitable information, as well as multiple authentication factors for the script 210.

One way by which the script 210 may be prepared for secure execution by the computer appliance 110 is by generating authentication factors for the script 210. Authentication factors are forms of digital evidence which can be used to attest to one or more characteristics of the script 210. The authentication factors may form part of the script security data 220, and therefore may be included in the script payload 205 in any suitable fashion. In some embodiments, the authentication factors are included as metadata for the script 210 and may provide indications of the circumstances surrounding the initial production of the script 210. For example, a timestamp indicative of a time at which the script 210 was produced may form part of the metadata of the script 210; the timestamp may be included as part of the script security data 220 and serve as an authentication factor for the script 210. By way of another example, the script security data 220 may include information about the origin of the script 210, about an entity which requested the script 210, about the computer appliance(s) on which the script 210 is to be executed, and the like. Throughout the present disclosure, reference will be made to various types of identifiers, including origin identifiers, requestor identifiers, target appliance identifiers, and the like. It should be understood that these identifiers may come in different forms, depending on the implementation, and serve to provide evidentiary proof of a characteristic of the script 210 based on the type of identifier.

Figure 3A:
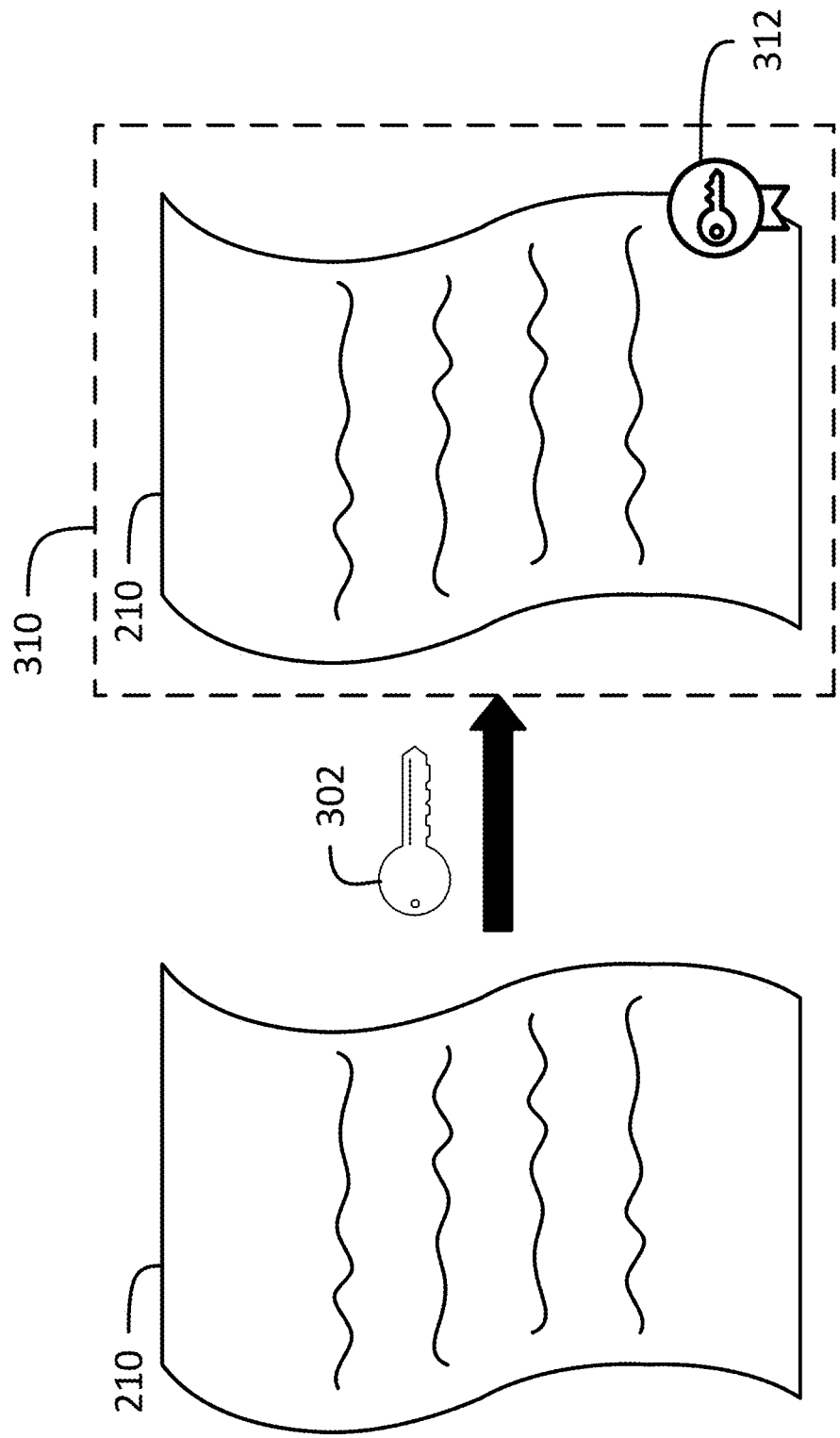
FIGS. 3A-B illustrate example approaches for producing scripts for secure execution.

With reference to FIG. 3A, one type of authentication factor is a digital signature: in FIG. 3A, a digital signature 312 is illustrated as being affixed to the script 210 as part of an example script payload 310, though it should be understood that the digital signature 312, which forms part of the script security data 220, may be packaged with the script 210—within the script payload 310—in any suitable fashion. The digital signature 312 is produced at least in part using a cryptographic key 302, which is applied to at least part of the script 210 via a mathematical function to produce the digital signature 312. In some cases, the cryptographic key 302 is applied to a hash of the script 210, which may be obtained in any suitable fashion. In the case of an asymmetric encryption process, the cryptographic key 302 used to sign the script 210, thereby producing the digital signature 312, may be a private key of the computing device 201 which produces the key. Once the script payload 310 is provided for execution, for instance by the computer appliance 110, the digital signature 312 can be validated using a public key of the computing device 201, which is freely obtainable, either from the computing device 201, or from a trusted key-providing entity. In the case of a symmetric encryption process, the cryptographic key 302 used to sign the script 210 is the same key that will be used to validate the digital signature 312.

Figure 3B:
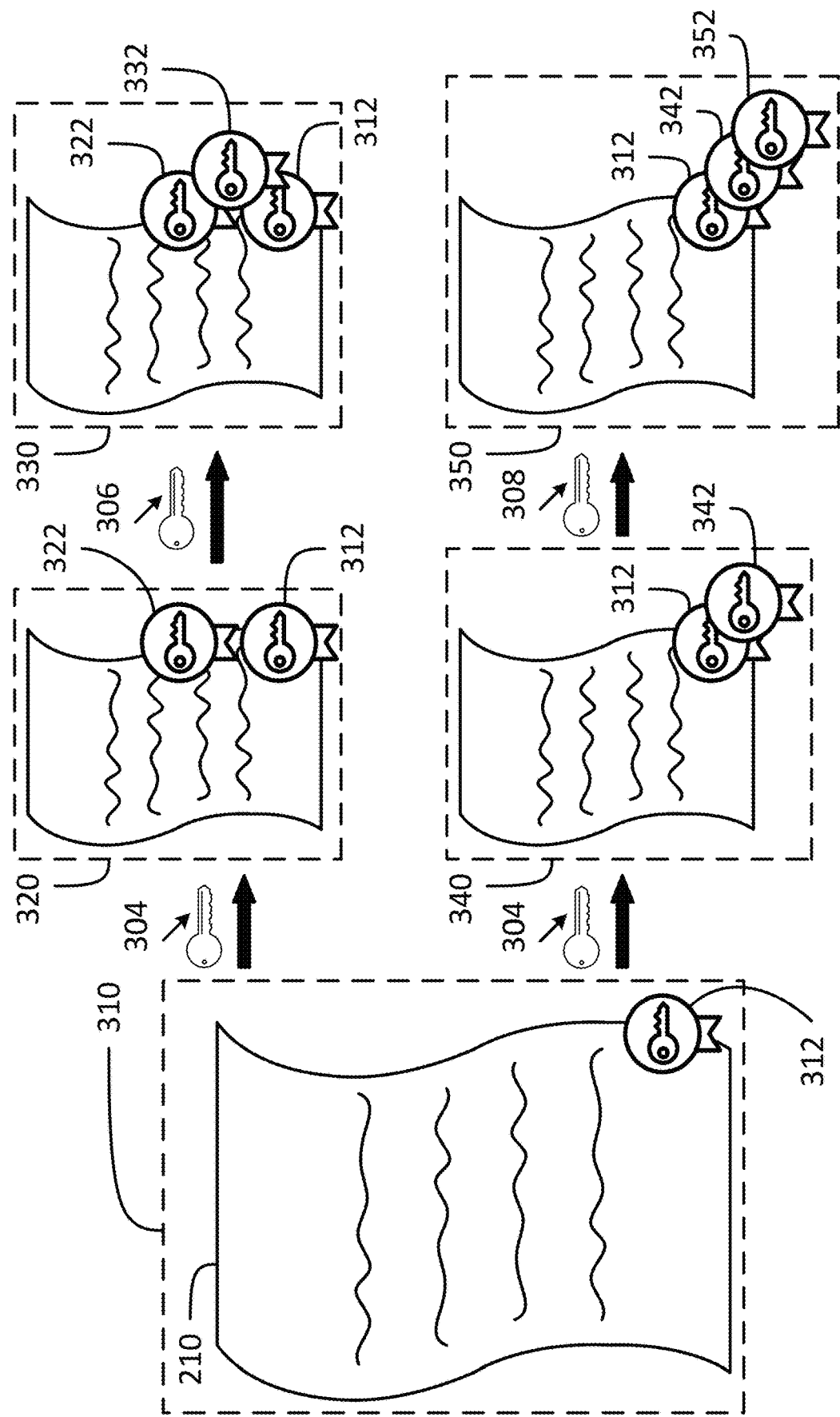

With additional reference to FIG. 3B, in some embodiments multiple digital signatures may be applied to the same script 210. Each of the digital signatures may be validated to authenticate the script 210, and failure to validate one of the multiple digital signatures may suffice for the script 210 to fail authentication. Starting from the script payload 310, composed of the script 210 and the digital signature 312, a cryptographic key 304 (different from the cryptographic key 302) may be used to generate a further digital signature. By way of a first example, the cryptographic key 304 may be applied to the script 210 itself to generate a digital signature 322, which forms part of the script payload 320. The digital signature 322 may be generated based on the script 210 as a whole or based on a hash thereof. In this example, both the digital signature 312 and the digital signature 322 are signatures for the script 210 itself; the digital signatures 312 and 322 can be termed "unencapsulated" signatures, since neither of the digital signatures 312 and 322 are contained within another digital signature.

By way of another example, the cryptographic key 304 may be applied to both the script 210 and the digital signature 312, as illustrated in the script payload 340, to generate an "encapsulating" digital signature 342. The digital signature 342 is said to be encapsulating because it is generated based on at least one separate digital signature, in this case the digital signature 312, and therefore contains at least part of the digital signature 312. Similarly, the digital signature 312 can be said to be "encapsulated" or "nested" within the digital signature 342. Because the digital signature 342 is based on both the script 210 and the digital signature 312, the digital signature 342 can be used to validate both the script 210 and the digital signature 312. Put differently, when the digital signature 342 is validated via the public key of the entity which generated the digital signature 342, or via the entity's symmetric encryption key, this serves as validation for both the script 210 and the digital signature 312. The digital signature 342 can be based on the script 210 and the digital signature 312 as a whole or based on a hash of the script 210 and the digital signature 312. For example, the digital signature 312 can be concatenated to the script 210, and a hash of the concatenation can be used as the basis for the digital signature 342.

Nested or encapsulating digital signatures can also be applied when the script 210 already has multiple unencapsulated signatures, and when the script 210 already has one or more encapsulating signatures. By way of one example, a cryptographic key 306 can be applied to the script 210 and the digital signatures 312, 322 (as seen in the script payload 320) to generate a script payload 330 in which the digital signature 332 encapsulates both the digital signature 312 and the digital signature 322. The digital signature 332 can be based on the script 210 and the digital signature 312 as a whole or based on a hash of the script 210 and the digital signature 312. By way of another example, a cryptographic key 308 can be applied to the script 210 and the digital signatures 312, 342 (as seen in the script payload 340) to generate a script payload 350 in which the digital signature 352 encapsulates the digital signature 342, which in turn encapsulates the digital signature 312. By nesting digital signatures within one another, an encapsulating signature can be used to validate both the script 210 and any encapsulated digital signatures. For instance, validating the digital signature 352 in the script payload 350 can be used to validate the script 210 as well as the digital signature 342 and, in some embodiments, the digital signature 312.

With continued reference to FIGS. 3A-B, in one practical, non-limiting example, the script 210 is first digitally signed with a cryptographic key (e.g., the cryptographic key 302) belonging to a user authorized to deploy the script 210 to produce the digital signature 312. For instance, the user is assigned a hardware authentication device (e.g., a Yubikey™) or other authentication token which includes the cryptographic key 302 used to produce the digital signature 312. Then, the script 210 is digitally signed with a cryptographic key (e.g., the cryptographic key 304) belonging to an entity from which the script 210 originates. In this example, the cryptographic key 304 may belong to an author or other authoring entity which produced the script 210, an entity which securely obtained the script 210 from a script repository, or the like. For instance, the script 210 is prepared for secure execution by an application running on a server or other computing device, and the cryptographic key 304 is associated with the application which prepares the script 210. The signing of the script 210 with the cryptographic key 304 may be used to produce the digital signature 322, which does not encapsulate the digital signature 312, or may be used to produce the digital signature 342, which does encapsulate the digital signature 312, thereby also signing the digital signature 312. Thereafter, an additional (i.e., third) cryptographic key can be used to sign the script 210 and, in some embodiments, one or both of the digital signatures 312 and 322 or 342. Alternatively, the third cryptographic key can be used to encrypt the script 210 and/or one or more of the digital signatures 312 and 322 or 342, for later decryption once the script is deployed.

The third digital signature may be produced using a cryptographic key associated with the computer appliance 110. By digitally signing the script 210 with a cryptographic key associated with the computer appliance 110, the computer appliance 110 can determine that it is authorized to execute the script 210. Put differently, the computer appliance 110 recognizes the third digital signature as being produced using a cryptographic key with which the computer appliance 110 is associated, thereby indicating that the computer appliance 110 is authorized to execute the script 210. In some embodiments, the computer appliance 110 is provided with a symmetric encryption key, a copy of which is also provided to the server or other computing device which runs the aforementioned application to prepare the script 210 for secure execution. The application can use the provided copy of the symmetric encryption key of the computer appliance 110 to encrypt the script 210 and/or one or more of the digital signatures 312 and 322 or 342. In some other embodiments, the computer appliance is provided with an asymmetric encryption key (i.e., a public-private key pair). The computer appliance 110 may maintain both the public and private keys, or only the private key. The aforementioned application, which prepares the script 210 for secure execution, may have a copy of the public key associated with the computer appliance 110, and may use the public key to encrypt the script 210 and/or one or more of the digital signatures 312 and 322 or 342, hashes thereof, or to encrypt an intermediary cryptographic key (e.g., a symmetric key) for use in decrypting parts of the script 210 and/or one or more of the digital signatures 312 and 322 or 342. This intermediary cryptographic key is itself be encrypted with a public key for later decryption using an associated private key, thereby allowing the script 210 and/or one or more of the digital signatures 312 and 322 or 342 to be decrypted once deployed. Depending on the implementation, the encryption key associated with the computer appliance 110 may be the encryption key 306, which produces the digital signature 332, the encryption key 308, which produces the digital signature 352, or any other suitable encryption key, which may be used to produce any suitable type of digital signature for the script 210 and which may or may not encapsulate one or more other digital signatures.

It should be understood that the various encryption schemes discussed hereinabove are non-limiting examples. Other approaches for securely executing the script 210, relying on other encryption schemes which involve one or more encapsulated digital signatures, are also considered. For example, a third digital signature may encapsulate only one previously generated digital signature; that is to say, the third digital signature may encapsulate only a first or a second, previously generated digital signature for the script 210. By way of another example, a second digital signature may encapsulate a first digital signature, and a third digital signature may encapsulate neither the first nor the second digital signature. Still further embodiments and implementations are considered.

Additionally, it should be understood that other types of authentication factors, beyond digital signatures, are also considered. By way of an example, the authentication factors may include one or more certificates which may be signed by one or more trusted authorities (sometimes referred to as "certificate signing authority") and which includes one or more public keys, for instance public keys based on the origin identifier, the requestor identifier, the target appliance identifier, or the like, and included as part of the script security data 220. The certificates can be based on any suitable standard, for instance the X.509 standard, and can include any suitable information, for instance based on the standard used. By verifying the trustworthiness of the certificate, the public key included therein may be used as part of the validation of the script 210. By way of another example, an authentication factor can involve encrypting the script 210 and/or the script security data 220 (i.e., the script payload 205 as a whole). For instance, the last authentication factor to be applied may involve encrypting the script payload 205 with a particular cryptographic key, to then be decrypted once the script payload 205 is deployed.

Figure 4:
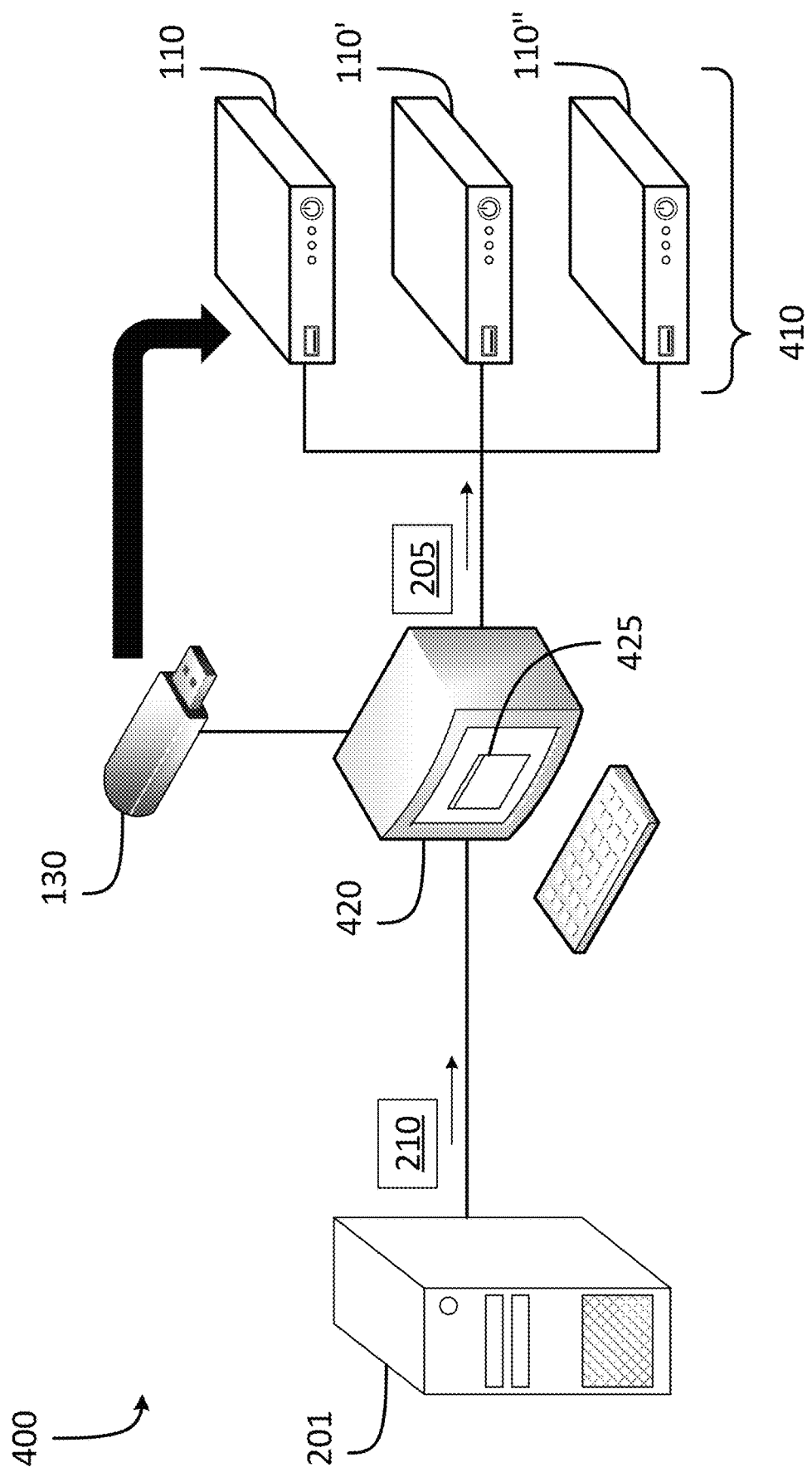
FIG. 4 is a schematic diagram of an example system for executing scripts.

With reference to FIG. 4, there is illustrated a system 400 which, at least in part, may serve for producing scripts for secure execution and/or for securely executing scripts on a computer appliance (e.g., the computer appliance 110). The system 400 is composed of the computing device 201, a computing device 420, and a number of computer appliances 410, including the computer appliance 110 and computer appliances 110' and 110". The computing device 420 may have access to a removable media device, for instance the USB drive 130, which may also be couplable to the computer appliance 410, for instance via the Universal Serial Bus (USB) standard. In some embodiments, the computer appliances 410 may be substantially similar to one another, for instance being different units of the same make and model. In some other embodiments, the computer appliances 410 may include computer appliances of varying makes and/or models, as appropriate. The computer appliances 410 are each communicatively coupled to the computing device 420, for instance over a local area network (LAN), over a wide-area network (WAN), or any other suitable type of network, for instance a local intranet. Additionally, the computing device 420 is coupled to the computing device 201, for instance over the Internet, over a WAN, or any other suitable type of network. In one example practical implementation, the computing device 420 is deployed at the same premises at which the computer appliances 410 are deployed. For example, the computer appliances 410 are each coupled to one or more access control devices at the premises and are responsible for controlling the operation thereof; the computing device 420 may be a central controller or server coupled to each of the computer appliances 410.

In the course of operation, it may be desirable to cause one or more scripts, for instance the script 210, to be executed by one or more of the computer appliances 410. For the sake of simplifying the following discussion, reference will be made primarily to the computer appliance 110; however, it should be understood that the computer appliance 110 may be substituted for any other one of the computer appliances 410, and that a same script 210 may be deployed to multiple ones of the computer appliance 410. A technician or other user may run a program 425 on the computing device 420 via which the technician can request a particular script or one or more particular tasks to be performed via a script. Although various actions are described hereinbelow as being performed by the computing device 420, it should be understood that these actions may be performed by the program 425 operating on the computing device 420, or by collaboration between the program 425 and the computing device 420.

The technician provides a requestor identifier to the computing device 420 which identifies the technician as the entity requesting the script. The requestor identifier may be any suitable type of identifier with which the technician is associated, for example a cryptographic key. In some embodiments, the requestor identifier is obtained from a hardware authentication device or similar device associated with the technician. The technician also provides an indication of the target device for deployment of the script, termed a target appliance identifier (in this case the computer appliance 110) to the computing device 420. For example, the technician may provide the computing device 420 with a unique identifier associated with the computer appliance, for instance a network address, appliance name, or the like. In some embodiments, the target appliance identifier may serve to identify a cryptographic key associated with the computer appliance 110, as will be described hereinbelow.

After obtaining the request, the computing device 420 may acquire a script, for instance the script 210, from the computing device 201 to produce the script 210 for secure execution (e.g., as part of a script payload, for instance the script payload 205. In some embodiments, the computing device 420 may acquire the script 210 from a database or other repository available on the computing device 201. In some other embodiments, the technician may desire a script 210 for one or more tasks which is not already available on the computing device 201; in such a case, the technician may make a request for a script to be produced by the party responsible for the computer appliance 110, for example the manufacturer or distributor of the computer appliance 110. The computing device 420 also obtains an origin identifier, which is indicative of an origin of the script 210. In some embodiments, the origin identifier may specify a cryptographic key associated with the computing device 201, with the computing device 420, or with the program 425, which may be used to produce a digital signature for the script 210. The cryptographic key may be a symmetric key associated with the computing device 420 and/or the program 425, one of a pair of asymmetric keys associated with the computing device 420 and/or the program 425, or any other suitable cryptographic key.

The computing device 420 then produces the script payload 205 to provide to the computer appliance 110. The computing device 420 produces script security data (e.g., the script security 220) to accompany the script 210 as part of the script payload 205. The computing device 420 uses at least some of the requestor identifier, the target appliance identifier, and the origin identifier to produce authentication factors for the script 210. By way of an example, the computing device 420 uses the requestor identifier to obtain an encryption key associated with the technician or other user which requested the script 210. The computing device 420 generates an authentication factor for the script 210, for example a digital signature, using the encryption key associated with the technician. The computing device 420 then uses the target appliance identifier and/or the origin identifier to produce additional authentication factors, which may take the form of additional digital signatures produced using encryption keys obtained based on the target appliance identifier and/or the origin identifier. Additionally, the additional authentication factors can encapsulate the first authentication factor, produced based on the requestor identifier. The encapsulation of the first authentication factor can be performed as described hereinabove in relation to FIG. 3B. For example, the origin identifier is used to obtain an encryption key associated with the computing device 201, which is then used to produce a digital signature for the script 210 and the first authentication factor, that is to say the aforementioned digital signature produced using the encryption key associated with the technician. The script 210 and the various authentication factors are then compiled to produce the script payload 205.

The script payload 205, once produced by the computing device 420, can be deployed for execution on the computer appliance 110. Because the script 210 is provided concomitantly with the script security data 220 as part of the script payload, the script 210 can be securely executed by the computer appliance 110. The computer appliance obtains the script payload 205 from the computing device 420. In some embodiments, the script payload 205 is provided over one or more networks which communicatively couple the computing device 420 to the computer appliance 110. In some other embodiments, the script payload 205 may be loaded onto the USB drive 130, which may be used to provide the script payload 205 to the computer appliance 110, for instance via the media interface 117. Other approaches for deploying the script payload 205 to the computer appliance 110 are also considered.

Once the script payload 205 is obtained by the computer appliance 110, the computer appliance 110 may obtain the multiple authentication factors included as part of the script security data 220 from the script payload 205. The computer appliance 110 can then perform various validations to authenticate the script 210 based on the authentication factors. By way of one non-limiting example, the computer appliance 110 performs a first validation based on an authentication factor associated with the origin identifier, for instance to validate a digital signature produced with an encryption key associated with the computing device 420. The first validation can authenticate both the script 210 and a second authentication factor which is encapsulated by the first authentication factor, for instance a digital signature produced with an encryption key associated with the user who requested the production of the script payload 205. In some embodiments, the script security data 220 may include additional authentication factor(s), for instance a digital signature produced with an encryption key associated with the computer appliance 110, which may be encapsulated or unencapsulated. The computer appliance 110 can perform additional validations to authenticate the script 210 and/or further encapsulated authentication factors, based on the additional authentication factor(s).

Additionally, in some embodiments, the computer appliance 110 may use other information to determine whether the script 210 should be executed. The computer appliance 110 can evaluate the functions or tasks present in the script 210, the access or permissions demanded by the script, or the like, to evaluate whether the script should be executed. For example, a particular script 210 may include, as part of its instructions, function calls associated with an administrator-level of privilege. The computer appliance 110 may, prior to executing the script, evaluate whether the user deploying the script 210 is authorized to deploy a script having function calls of the administrator level. Proof of authorization may be provided as part of the script security data 220 or may be requested by the computer appliance 110 upon receipt of the script payload 205. The user may provide proof of their authorization via their hardware authentication device, by providing successful login information, or the like. In some other embodiments, different computer appliances 110 may be associated with different permission levels, with only certain users being authorized to deploy scripts (e.g., the script 210) thereon. The computer appliance may, prior to executing the script, evaluate whether the user deploying the script 210 is authorized to deploy a script on the computer appliance 110. Other authorization-based schemes are also considered.

As part of executing the script 210, in some embodiments, the computer appliance 110, the computing device 420, and/or by the computing device 201 may maintain logs, audit information, or other relevant records regarding the execution of the script 210, and of other scripts, by the computer appliance 110. By way of an example, upon approving the script 210 for execution, the computer appliance 110 may update a log or other record maintained by the computer appliance 110. The log may include part or all of the script 210, part or all of the script security data 220, the script payload 205 as a whole, information about the functions or tasks executed based on the script 210, information about the user deploying the script 210, metadata about the execution of the script 210, for instance a time of execution, and/or any other relevant data. By way of another example, the log may be stored in a remote database or cryptographic ledger, which may be maintained by the computing device 420 and/or by the computing device 201. In some embodiments, the log may also include the unique identifier associated with the script 210 and/or the script payload 205. Users from the responsible entity and/or the operating party may, with appropriate permissions, access the logs, audit information, or other relevant records to review the use of the computer appliance 110, including to review the scripts 210 deployed to the computer appliance 110 and the context of their deployment. In some cases, review of the logs, audit information, or other relevant records may be performed in part via a script 210 configured to acquire the logs and provide them to a user performing the audit.

Figure 5:
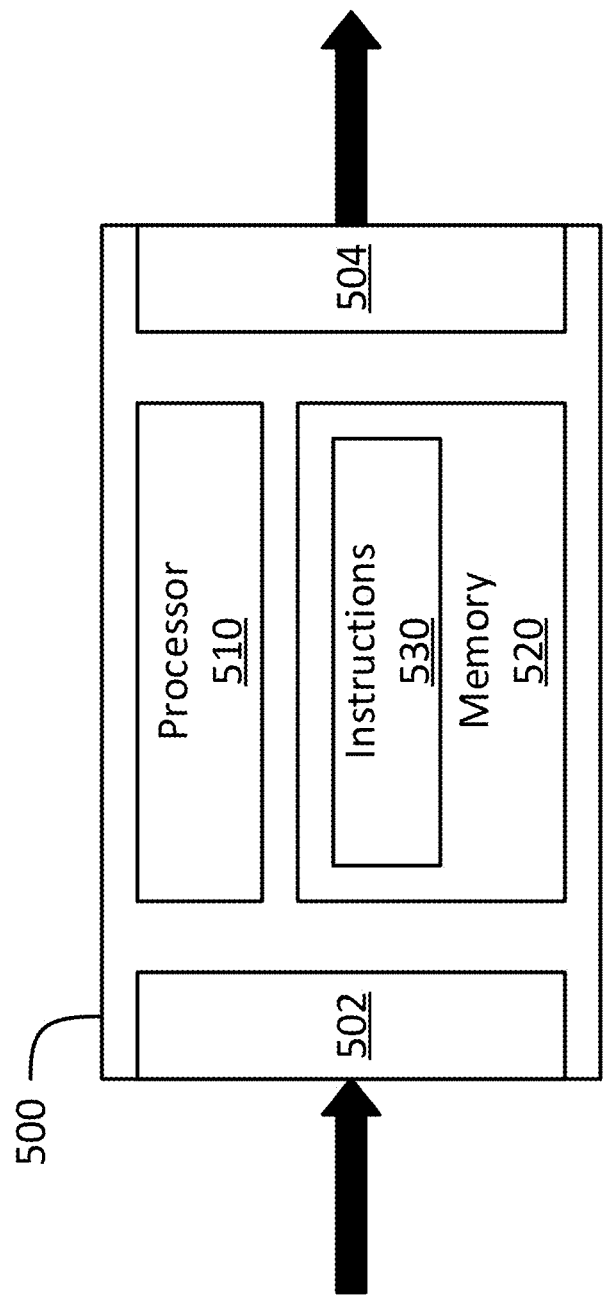
FIG. 5 is a block diagram of an example computing system.

With reference to FIG. 5, there is illustrated a schematic diagram of an example computing device 500. As depicted, the computing device 500 includes at least one processing unit 510, a memory 520, and program instructions 530 stored within the memory 520, as well as input and output interfaces (I/O interfaces) 502 and 504, respectively. For simplicity, only one computing device 500 is shown, but computing apparatuses 110, 110', 110", the computing device 420, and/or the computing device 201 may be embodied by one or more implementations of the computing device 500. The computing devices 500 may be the same or different types of devices. The components of the computing device 500 may be connected in various ways including directly coupled, indirectly coupled via a network, and distributed over a wide geographic area and connected via a network, for instance via a cloud computing implementation.

The I/O interfaces 502, 504 may include one or more media interfaces, via which removable media or other data sources may be coupled, one or more network interfaces, or any other suitable type of interface. The I/O interfaces 502, 504 of the computing device 500 may additionally, in some embodiments, provide interconnection functionality to one or more input devices, such as a keyboard, mouse, camera, touch screen and a microphone, or with one or more output devices such as a display screen and a speaker. In embodiments in which the I/O interfaces 502, 504 include one or more network interfaces, the network interface(s) of the computing device 500 may enable the computing device 510 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The processing unit 510 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The memory 520 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In certain embodiments, the computing device 500 is operable to register and authenticate users (using a login, unique identifier, and password for example) prior to providing access to applications, a local network, network resources, other networks, and network security devices. The computing device 500 may serve one user or multiple users.

For example, and without limitation, the computing device 500 may be a server, network appliance, set-top box, embedded device, computer expansion module, personal computer, laptop, personal data assistant, cellular telephone, smartphone device, Ultra-Mobile Personal Computer (UMPC) tablets, video display terminal, gaming console, electronic reading device, and wireless hypermedia device or any other computing device capable of being configured to carry out the methods and/or implementing the systems described herein.

Figure 6:
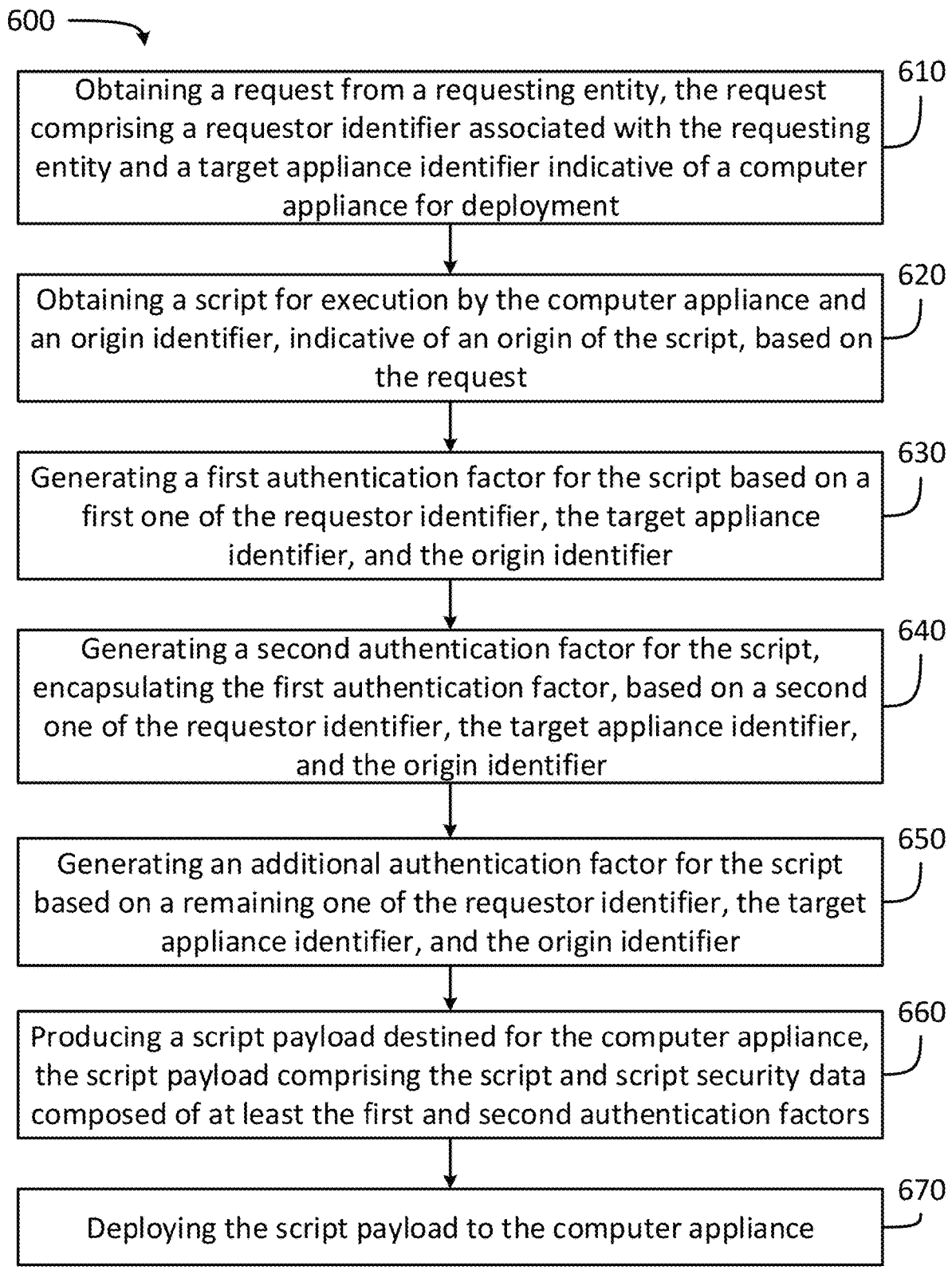
FIG. 6 is a flowchart illustrating an example method for producing scripts for secure execution.

With reference to FIG. 6, there is illustrated a method 600 for producing scripts for secure execution. The method 600 may be implemented, for example, by the computing apparatus 420 of FIG. 4. In some embodiments, certain steps of the method 600 may be repeated; in some other embodiments, certain steps of the method 600 may be eschewed, depending on the particulars of the implementation. Additionally, the order of at least some of the steps in the method 600 may be varied according to the particulars of the implementation.

At step 610, the method 600 includes obtaining a request from a requesting entity, the request comprising a requestor identifier associated with the requesting entity and a target appliance identifier indicative of a computer appliance for deployment, for instance the computer appliance 110. The requesting entity may be a technician or other user of the computing device 420, who may be provide the requestor identifier in the form of a cryptographic key associated with themselves, or in any other suitable form. For example, the user may provide their cryptographic key via a hardware authentication device or other similar device. The target appliance identifier may include a unique ID associated with the computer appliance 110, a network address of the computer appliance 110, a public cryptographic key associated with the computer appliance 110, or any other suitable identifier of the computer appliance 110. In embodiments in which the requestor identifier includes a user name, user ID, or the like, step 610 may additionally include using the requestor identifier to obtain a cryptographic key associated with the requesting entity. Similarly, in embodiments in which the target appliance identifier includes a unique ID, network address, or other identifier of the computer appliance 110, step 610 may additionally include using the target appliance identifier to obtain a cryptographic key associated with the computer appliance 110, for instance a public key of a public-private key pair associated with the computer appliance 110.

At step 620, the method 600 includes obtaining a script for execution by the computer appliance 110, for instance the script 210, and an origin identifier, which is indicative of an origin of the script 210. The script 210 and the origin identifier may be obtained based on the request, which may be provided, for example, to the computing device 201. In some embodiments, the request may additionally specify certain tasks or purposes for which the user is requesting a script. The computing device 201 may select the script 201 to be provided based on the tasks or purposes indicated in the request and may additionally select the appropriate origin identifier for the script 210 once the script 210 is selected. For clarity, step 620 comprises obtaining the script 210, which is to be executed on the computer appliance 110, but the script 210 is not executed as part of step 620. The origin identifier for the script 201 may be an author name or ID, a publisher name or ID, or the like, or may be a cryptographic key associated with the author, publisher, distributor, or other relevant authority associated with the script 210. In embodiments in which the origin identifier does not include a cryptographic key, step 620 may additionally include using the origin identifier to obtain a cryptographic key associated with the author, publisher, distributor, or other relevant authority associated with the script 210.

At step 630, the method 600 includes generating a first authentication factor for the script based on a first one of the requestor identifier, the target appliance identifier, and the origin identifier. The first authentication factor may include a digital signature produced using a cryptographic key obtained as part of the requestor identifier, the target appliance identifier, or the origin identifier, or a cryptographic key obtained based on any of the listed identifiers. The digital signature may be produced using the script 210 as a whole, using a hash or other modified version of the script 210, using salting or other security techniques, or the like. Additionally, the first authentication factor may also include additional information, as appropriate: for example, the authentication factor may include a timestamp or other metadata associated with the digital signature, or the like.

At step 640, the method 600 includes generating a second authentication factor for the script based on a second one of the requestor identifier, the target appliance identifier, and the origin identifier. The second authentication factor encapsulates the first authentication factor; that is to say, the second authentication factor is generated based on the first authentication factor. The second authentication factor may include a digital signature produced using a cryptographic key obtained as part of a different one of the requestor identifier, the target appliance identifier, or the origin identifier, or a cryptographic key obtained based on any other one of the listed identifiers (i.e., one of the identifiers not used to generate the first authentication factor at step 630). The digital signature may be produced using the script 210 and the first authentication factor as a whole, using a hash or other modified version of the script 210 and the first authentication factor, using salting or other security techniques, or the like. Additionally, the second authentication factor may also include additional information, as appropriate: for example, the authentication factor may include a timestamp or other metadata associated with the digital signature, or the like.

At step 650, in some embodiments the method 600 includes generating an additional authentication factor for the script 210 based on a remaining one of the requestor identifier, the target appliance identifier, and the origin identifier. In some embodiments, the additional authentication factor encapsulates one or more of the first and second authentication factors. In some other embodiments, the additional authentication factor does not encapsulate any other authentication factors. Additionally, in some embodiments, step 650 may be performed prior to step 640, and the second authentication factor may also encapsulate the additional authentication factor generated at step 650. The additional authentication factor may include a digital signature produced using a cryptographic key obtained as part of the remaining one of the requestor identifier, the target appliance identifier, or the origin identifier, or a cryptographic key obtained based on any other one of the listed identifiers (i.e., the one of the identifiers not used to generate the first and second authentication factors at step 630 and 640). The digital signature may be produced using the script 210, as well as any encapsulated authentication factors, as a whole, using a hash or other modified version of the script 210 and any encapsulated authentication factors, using salting or other security techniques, or the like. Additionally, the additional authentication factor may also include additional information, as appropriate: for example, the authentication factor may include a timestamp or other metadata associated with the digital signature, or the like.

At step 660, the method 600 includes producing a script payload, for instance the script payload 205, which is destined for the computer appliance 110. The script payload 205 includes the script 210 and the script security data 220, which is composed of the first and second authentication factors, as well the additional authentication factor, if generated at step 650. The script 210 and the script security data 220 can be packaged in any suitable fashion, for instance according to a particular standard, to produce the script payload 205. As described hereinabove, the script payload 205 can be produced by the computing apparatus 420 for deployment to the computing apparatus 110.

In some embodiments, the script payload 205, once produced, may be associated with a unique identifier (e.g., a unique number, name, or the like). The unique identifier may be determined in any suitable fashion, for instance by the computing device 420. In some cases, the computing device 420 may then cause the unique identifier to be stored in a repository, for example a remote database or cryptographic ledger, which may be maintained by the computing device 420 and/or by the computing device 201. In some other cases, the computing device 420 may cause the unique identifier to be listed in a distributed ledger; an instance of the distributed ledger may be maintained by the computing device 420 and/or by the computing device 201. In this fashion, the unique identifier associated with the script payload 205 can be used to validate the script 210. Alternatively, the unique identifier may be provided in the script security data 220 to be added to the repository only once the script payload 205 is deployed to the computer appliance 110, or once the script 210 is executed by the computer appliance 110. Other use cases for the unique identifier of the script payload 205 are also considered.

At step 670, in some embodiments the method 600 includes deploying the script payload 205 to the computer appliance 110. For example, the script payload 205 may be deployed by the computing device 420 to the computer appliance 110 over a network via which the computing device 420 and the computer appliance 110 are communicatively coupled. The script payload 205 may be deployed to the computer appliance 110 at a predetermined time (e.g., as part of scheduled maintenance) and/or punctually (e.g., in response to a request to deploy the script payload 205). By way of an example, a script payload 205 configured to cause the computer appliance 110 to produce a daily log of actions performed by the computer appliance 110 can be deployed to the computer appliance 110 at the same time every day. By way of another example, a script payload 205 configured to cause the computer appliance 110 to reinitialize settings to pre-set values can be deployed to the computer appliance 110 in response to determining that the computer appliance 110 is malfunctioning. Other situations in which the script payload 205 is deployed to the computer appliance 110 are also considered.

Figure 7:
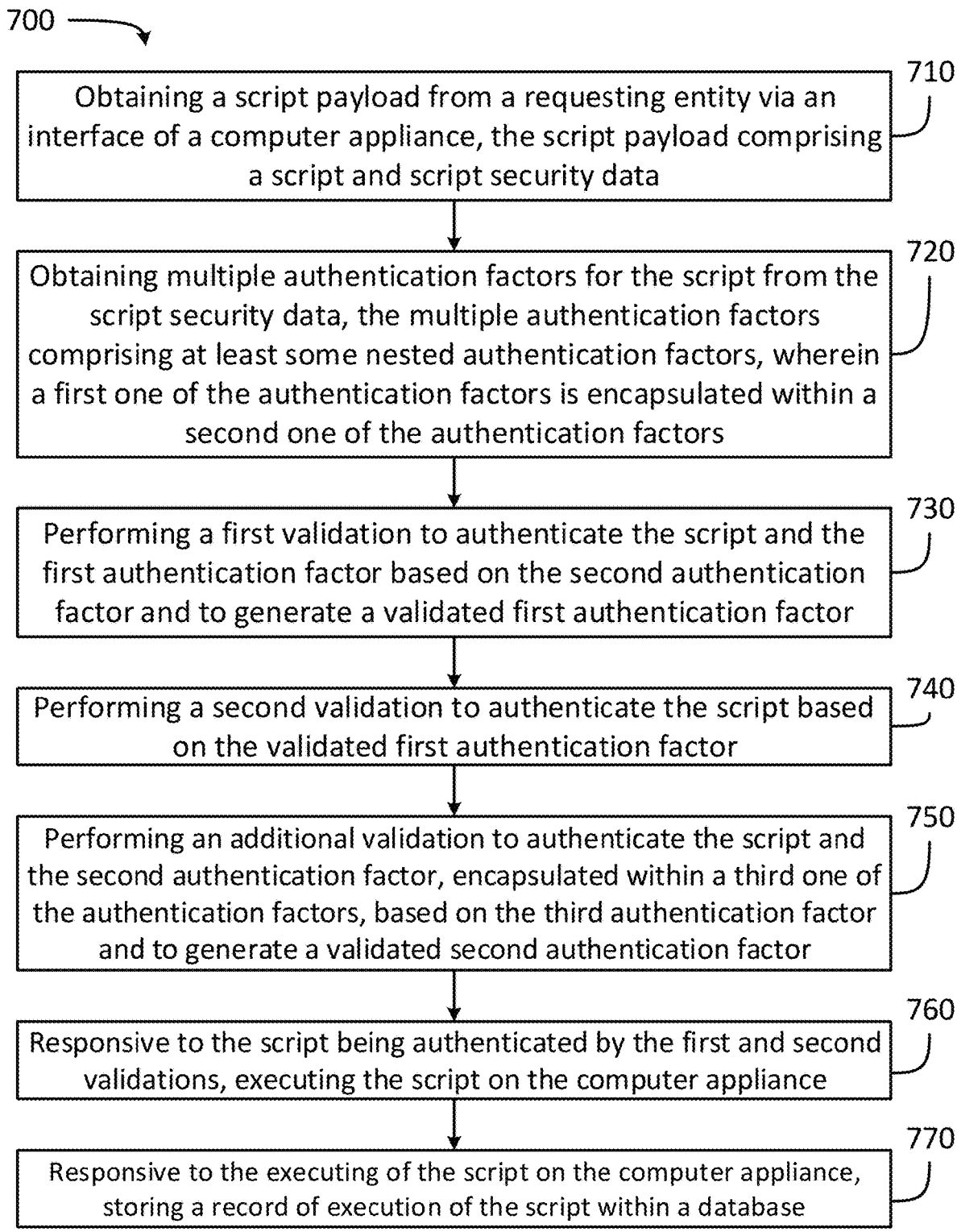
FIG. 7 is a flowchart illustrating an example method for security executing a script on a computer appliance.

With reference to FIG. 7, there is illustrated a method 700 for securely executing a script on a computer appliance. The method 700 may be implemented, for example, by the computer appliance of FIG. 1. In some embodiments, certain steps of the method 700 may be repeated; in some other embodiments, certain steps of the method 700 may be eschewed, depending on the particulars of the implementation. Additionally, the order of at least some of the steps in the method 700 may be varied according to the particulars of the implementation.

At step 710, the method 700 includes obtaining a script payload, for example the script payload 205, from a requesting entity via an interface of the computer appliance 110. The script payload 205 comprises, as described hereinabove, the script 210 and the script security data 220. In some embodiments, a timestamp or other time indicator indicative of a requesting time at which the script payload 205 was obtained is also obtained concomitantly with the script payload 205. For instance, the script payload 205 may include, as part of the script security data 220, or as part of metadata of the script payload 205, a timestamp or other indicator of a time at which the script payload 205 was obtained as part of step 710. Other timestamps may also be included in the script payload 205, for instance a timestamp indicative of a time at which the script 210 was produced, a timestamp indicative of a time at which authentication factors included in the script security data 220 were generated, and the like. It should be noted that the script payload 205 may be obtained over a network interface of the computer appliance, for instance the network interface 116, or via another interface, for instance the media interface 117, via which a removable media device may be couplable to the computing device 110, for instance the USB drive 130.

At step 720, the method 700 includes obtaining multiple authentication factors for the script 210 from the script security data 220. The multiple authentication factors include at least some nested authentication factors, that is to say, at least one of the authentication factors is encapsulated within another one of the authentication factors. The authentication factors include an origin identifier, a requestor identifier associated with the requesting entity, and a target appliance identifier, and a first one of the authentication factors is encapsulated within a second one of the authentication factors. The authentication factors may include digital signatures associated with each of the origin identifier, the requestor identifier, and the target appliance identifier. For example, the origin identifier is, or identifies, a cryptographic key used to produce a digital signature of the script 210; similarly, the requestor identifier and the target appliance identifier are, or identify, respective cryptographic keys used to produce digital signatures of the script 210. In one example implementation, the first authentication factor includes a digital signature produced using a cryptographic key associated with the requestor identifier, and the second authentication factor includes a digital signature produced using a cryptographic key associated with the origin identifier, which encapsulates the first authentication factor, that is to say, the digital signature produced using the cryptographic key associated with the requestor identifier.

In some embodiments, the script payload 205 is associated with a unique identifier, which is also obtained as part of step 720. The unique identifier may be implemented in any suitable format or type (e.g., a unique number or name), and may be provided as part of the script security data 220. In some embodiments, the unique identifier may also be stored in remote database, distributed ledger, cryptographic ledger, or the like, and may be used to authenticate the script, as will be described hereinbelow. For instance, the remote database or the cryptographic ledger may be maintained by the computing device 420 and/or by the computing device 201; in the case of a distributed ledger, at least one instance of the distributed ledger may be maintained by the computing device 420 and/or by the computing device 201.

At step 730, the method 700 includes performing a first validation to authenticate the script 210 and the first authentication factor. The first validation is based on the second authentication factor, which encapsulates the first authentication factor, and generates a validated first authentication factor. The first validation may include using a digital signature forming part of the second authentication factor to authenticate the script 210 and the first authentication factor. For example, the digital signature forming part of the second authentication factor may have been generated using a cryptographic key associated with the origin identifier; the digital signature may then be validated to validate the script 210 and the first authentication factor. In one instance, the second authentication factor is generated using a symmetric cryptographic key associated with the origin identifier, and thus can be validated using the same symmetric cryptographic key. In another instance, the second authentication factor is generated using a private cryptographic key of an asymmetric private-public key pair associated with the origin identifier, and thus can be validated using the public cryptographic key of the key pair.

Because the second authentication factor encapsulates the first authentication factor, validating the digital signature forming part of the second authentication factor can be used to validate both the script 210 and the first authentication factor. In this fashion, step 730 generates a validated first authentication factor, which can then be used to also authenticate the script 210. In some embodiments, the second authentication factor may encapsulate additional authentication factors beyond the first authentication factor, which may also be validated as part of step 730, thereby producing additional validated authentication factors, which may also be used to authenticate the script 210. It should also be noted that other information included in the script payload may also be validated on the basis of the nested authentication factors or be otherwise associated with authentication factors in order to be validated. For instance, a timestamp included in the script security data 220 or elsewhere as part of the script payload 205 may be validated using one or more of the authentication factors, as appropriate.

At step 740, the method 700 comprises performing a second validation to authenticate the script 210 based on the validated first authentication factor, generated at step 730. The second validation may include using a digital signature forming part of the validated first authentication factor to authenticate the script 210. For example, the digital signature forming part of the validated first authentication factor may have been generated using a cryptographic key associated with the requestor identifier; the digital signature may then be validated to validate the script 210. In one instance, the first authentication factor is generated using a symmetric cryptographic key associated with the requestor identifier, and thus can be validated using the same symmetric cryptographic key. In another instance, the first authentication factor is generated using a private cryptographic key of an asymmetric private-public key pair associated with the requestor identifier, and thus can be validated using the public cryptographic key of the key pair. In some embodiments, the cryptographic key associated with the requestor identifier may be obtained from a hardware authentication device or other authentication token, which may be obtained by the computer appliance 110, for instance, via the media interface 117, In some other embodiments, the cryptographic key associated with the requestor identifier may have been previously obtained by the computer appliance 110 or may be included as part of the script security data 220.

In some embodiments, performing the second validation includes determining a requestor class to which the requesting entity, associated with the requestor identifier, belongs. Multiple requestor classes, associated with different levels of permissions, may be established, and the user acting as the requesting entity belongs to a particular one of the requestor classes. Then, as part of performing of the second validation, the computer appliance 110 may determine whether the requestor class, to which the user belongs, is authorized to execute the script 210, for instance based on an authorized requestor class list, which may be obtained from the script security data 220, or which may have been previously obtained by the computer appliance 110.

In certain embodiments, the first validation (performed at step 730) and/or the second validation (performed at step 740) may include authenticating the script based on remaining unencapsulated authentication factors. By way of an example, the script security data 220 may include one or more unencapsulated authentication factors, for instance digital signatures which form part of the unencapsulated authentication factors may have been generated using a cryptographic key associated with the target appliance identifier, or any other suitable cryptographic key. The first and/or second validation may therefore include validated the digital signatures using appropriate cryptographic keys to validate the script 210 based on the validated digital signatures. In some embodiments, the second authentication factor may encapsulate additional authentication factors, which may then also be used to authenticate the script as part of the second validation, performed at step 740. By way of another example, an appliance identifier associated with the computer appliance 110, which is known to the computer appliance 110, may be compared to the target appliance identifier obtained by the computer appliance 110 as part of the script security data 220. In the event of a mismatch between the appliance identifier and the target appliance identifier, the computer appliance may not authenticate the script 210. Alternatively, the multiple authentication factors obtained at step 720 may include a list of target appliance identifiers, and the computer appliance 110 may compare its appliance identifier to the list of target appliance identifiers to determine whether its appliance identifier is present in the list. In the event that the appliance identifier of the computer appliance 110 is not present in the list of target appliance identifiers, the computer appliance may not authenticate the script 210. By way of a further example, the computer appliance 110 may belong to an appliance class. The computer appliance 110 may determine, based on the target appliance identifier, at least one approved appliance class for which execution of the script 210 is authorized. The computer appliance 110 may then determine, based on the appliance identifier of the computer appliance 110, whether it belongs to one or more of the approved appliance classes indicated by the target appliance identifier.

In some embodiments, the first validation (performed at step 730) and/or the second validation (performed at step 740) may additionally include authenticating the script 210 based on an age of the script 210. The script payload 205 may include a timestamp or other value indicating a time at which the script payload 205 as a whole, or any parts thereof, were generated. For example, the script payload 205 may be associated with a first timestamp, the script 210 may be associated with a second timestamp, and the authentication factors in the script security data 220 may also be associated with respective timestamps. The second validation may include determining whether an age of the script payload 205, the script 210, and/or any elements in the script security data 220 are within an allowable age range. For instance, the computer appliance 110 may be provided with rules regarding the allowable age range and may refuse to execute a script 210 for which one or more elements of the script payload 205 are older than the allowable age range. For instance, the computer appliance 110 may be instructed not execute the script 210 if the script payload 205 is more than one (1) day old, or if an authentication factor associated with the target appliance identifier is more than one (1) day old. In another instance, the computer appliance 110 may be instructed not execute the script 210 if the script 210 is more than three (3), six (6), or twelve (12) months old. Other particular rules are also considered. For example, the computer appliance 110 may compare a timestamp associated with the script payload 205 with a requesting time at which the script payload 205 was obtained. The second validation may include authenticating the script based on a delay duration between the requesting time and the timestamp associated with the script payload 205. For instance, the computer appliance 110 may be instructed to refuse to execute any scripts 210 for which the delay duration is greater than a particular value, e.g., more than a few hours, more than a few days, or the like. By way of another example, the computer appliance 110 may determine whether the requesting time, at which the script payload 205 was obtained, is within a maintenance time frame established for the computer appliance 110 during which execution of the script 210 is permitted. In the event that the requesting time of the script payload 205 falls outside the maintenance time frame, the computer appliance 110 may refuse to execute the script 210; if the requesting time is within the time frame, then the script 210 may be executed.

At step 750, in some embodiments, the method 700 includes performing an additional validation to authenticate the script 210 and the second authentication factor based on a third authentication factor to generate a validated second authentication factor. In embodiments in which step 750 is performed, the second authentication factor is encapsulated within a third one of the authentication factors, and the first validation performed as part of step 730 may be based on a validated second authentication factor. As such, in some cases, step 750 may be performed before step 730. This additional validation may include using a digital signature forming part of the third authentication factor to authenticate the script 210 and the second authentication factor. For example, a digital signature forming part of the third authentication factor may then be validated to validate the script 210 and the second authentication factor. In one instance, the first authentication factor is associated with the requestor identifier, the second authentication factor is associated with the origin identifier, and the third authentication factor is associated with the target appliance identifier. Thus, the script is first digitally signed with a cryptographic key associated with the requestor identifier, then with a cryptographic key associated with the origin identifier, and then with a cryptographic key associated with the target appliance identifier.

As described hereinabove, in some embodiments the script payload 205 is associated with a unique identifier, which may be provided in the script security data 220, and may also be stored in a remote database, distributed or cryptographic ledger, or the like (for simplicity, reference will be made hereafter to the cryptographic ledger, although other embodiments are also considered). In some such embodiments, the additional validation may include authenticating the script 210 by obtaining the unique identifier and determining whether the unique identifier is present in the cryptographic ledger. In some cases, the additional validation aims to determine that the script payload 205 has not previously been deployed; if the unique identifier associated with the script payload 205 is present in the cryptographic ledger, then this indicates that the script payload 205 has been previously deployed. If the script payload 205 is found to have been previously deployed, the script 210 may not be authenticated and the computer appliance 110 may refuse to execute the script 210. Conversely, if the script payload 205 is found not to have been previously deployed, the script 210 may be authenticated and the computer appliance 110 may then execute the script 210, provided the other validations also authenticate the script 210. In some other cases, the additional validation aims to determine that the script payload 205 was produced in a secure fashion, which would include storing the unique identifier associated with the script payload 205 in the cryptographic ledger. Put differently, the additional validation performed by the computer appliance 110 is to check whether the unique identifier received in the script security data 220 is present the cryptographic ledger to ensure that the script payload 205 can be authenticated. If the unique identifier of script payload 205 is not found in the cryptographic ledger, the script 210 may not be authenticated and the computer appliance 110 may refuse to execute the script 210. Conversely, if the script payload 205 is found in the cryptographic ledger, the script 210 may be authenticated and the computer appliance 110 may then execute the script 210, provided the other validations also authenticate the script 210. Other implementations by which the unique identifier for the script payload 205 can be used to authenticate the script 210 are also considered.

At step 760, the method 700 comprises executing the script 210 on the computer appliance 110 responsive to the script 210 being authenticated by at least the first and second validations, and by any additional validations performed as part of the method 700. The script 210 may be executed in any suitable fashion by the computer appliance 110, depending on the format in which the script 210 is deployed to the computer appliance 110 as part of the script payload 205.

At step 770, in some embodiments, responsive to the script 210 being executed on the computer appliance 110, the method 700 includes storing a record of execution of the script within a database. The database may be local to the computer appliance 110, or a remote database, which may be maintained by the computing device 420 and/or by the computing device 201 and accessed by the computer appliance 110 over a network. The database may also be implemented as a cryptographic or distributed ledger, which may be maintained by the computing device 420 and/or by the computing device 201. The record may include information about the user which caused the script payload 205 to be deployed to the computer appliance 110, the requesting time at which the script payload 205 was deployed to the computer appliance 110, and the like. The record may also include the unique identifier associated with the script payload 205, when it is included as part of the script payload 205.

By deploying the script 210 to the computer appliance 110 as part of the script payload 205, the script 210 can be provided concomitantly with the script security data 220 to allow the computer appliance 110 to validate the script prior to execution. In this fashion, the script 210 can be executed securely even without the presence of technicians or the like from the entity responsible for the computer appliance 110. Thus, the responsibility of executing scripts, such as the script 210, on the computer appliance 110 can be devolved to the party operating the computer appliance 110, which may result in reduced wait times for the operating party, and reduced burden on the responsible entity.

The embodiments of the methods, systems, devices, and computer-readable media described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and at least some of the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions, and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

What is claimed is:

1. A method of securely executing a script on a computer appliance, comprising:
    obtaining a script payload from a requesting entity via an interface of the computer appliance, the script payload comprising the script and script security data;
    obtaining multiple authentication factors for the script from the script security data, the multiple authentication factors comprising at least some nested authentication factors, wherein a first one of the authentication factors is encapsulated within a second one of the authentication factors;
    performing a first validation to authenticate the script and the first authentication factor based on the second authentication factor and to generate a validated first authentication factor;
    performing a second validation to authenticate the script based on the validated first authentication factor; and
    responsive to the script being authenticated by the first and second validations, executing the script on the computer appliance.

2. The method of claim 1, wherein said performing the first validation comprises authenticating the script based on an origin identifier as the second authentication factor.

3. The method of claim 1, wherein said performing the second validation comprises authenticating the script based on a requestor identifier as the first authentication factor.

4. The method of claim 1, wherein said performing the first validation further authenticates an additional authentication factor, encapsulated within the second authentication factor, and generates a validated additional authentication factor, and wherein said performing the second validation further authenticates the script based on the validated additional authentication factor.

5. The method of claim 1, comprising performing an additional validation to authenticate the script and the second authentication factor, encapsulated within a third authentication factor, based on the third authentication factor and to generate a validated second authentication factor, wherein said performing the first validation is based on the validated second authentication factor, wherein;
    the third authentication factor, on which the additional validation is based, is a target appliance identifier;
    the second authentication factor, on which the first validation is based, is an origin identifier;
    the second authentication factor, on which the first validation is based, is a requestor identifier.

6. The method of claim 1, wherein said performing the second validation further authenticates a third authentication factor, encapsulated within the first authentication factor, to generate a validated third authentication factor, and comprising performing an additional validation to authenticate the script based on the validated third authentication factor.

7. The method of claim 1, comprising:
    determining a requesting time at which the script payload was obtained; and
    comparing the requesting time to a timestamp associated with the script and obtained from the script security data;
    wherein said performing the second validation to authenticate the script is further based on a delay duration between the requesting time and the timestamp.

8. The method of claim 1, comprising:
    determining a requesting time at which the script payload was obtained; and determining whether the requesting time is within a maintenance time frame during which execution of the script is permitted;
    wherein said executing the script is performed responsive to the requesting time being within the maintenance time frame.

9. The method of claim 1, wherein said performing the first validation to authenticate of the script comprises:
    obtaining a digital signature indicative of an origin identifier; and
    validating the digital signature based on the second authentication factor to generate the validated first authentication factor.

10. The method of claim 1, wherein said performing the second validation comprises obtaining an authentication token associated with the requesting entity.

11. The method of claim 10, comprising obtaining the authentication token via a media interface of the computer appliance.

12. The method of claim 10, wherein said performing the second validation comprises decrypting a portion of the script using an encryption key obtained from the script security data.

13. The method of claim 10, wherein said performing the second validation comprises decrypting a portion of the script using an encryption key previously obtained by the computer appliance.

14. The method of claim 1, wherein said performing the second validation comprises:
   determining a requester class to which the requesting entity belongs; and
   determining whether the requester class is authorized to request execution of the script.

15. The method of claim 1, wherein said performing the second validation to authenticate the script comprises determining whether an appliance identifier associated with a computer appliance corresponds to a target appliance identifier obtained from the script security data.

16. The method of claim 1, wherein said performing the second validation to authenticate the script comprises:
   determining, based on a target appliance identifier, at least one approved appliance class for which execution of the script is authorized; and
   determining whether the computer appliance belongs to one of the at least one approved appliance class based on an appliance identifier associated with the computer appliance.

17. The method of claim 1, wherein said obtaining the script payload comprises obtaining the script payload over a network via a network interface of the computer appliance.

18. The method of claim 1, wherein said obtaining the script payload comprises obtaining the script payload from a removable media device couplable to the computer appliance via a media interface of the computer appliance.

19. The method of claim 1, comprising responsive to said executing the script on the computer appliance, storing a record of execution of the script within a database.

20. The method of claim 19, wherein said storing the record of execution of the script comprises storing a unique identifier associated with the script payload, and obtained from the script security data, in a cryptographic ledger accessible to the computer appliance.

21. The method of claim 19, comprising performing an additional validation to authenticate the script by obtaining the unique identifier and determining whether the unique identifier is present in the cryptographic ledger.

22. A system, comprising:
   a script source providing a script payload via an interface, the script payload comprising a script and script security data; and
   a computer appliance communicatively couplable to the script source to obtain the script payload therefrom via an interface of the computer appliance, the computer appliance configured for:
      obtaining a script payload from a requesting entity via an interface of the computer appliance, the script payload comprising the script and script security data;
      obtaining multiple authentication factors for the script from the script and the script security data, the multiple authentication factors comprising at least some nested authentication factors, wherein a first one of the authentication factors is encapsulated within a second one of the authentication factors;
      performing a first validation to authenticate the script and the first authentication factor based on the second authentication factor and to generate a validated first authentication factor;
      performing a second validation to authenticate the script based on the validated first authentication factor; and
      responsive to the script being authenticated by the first and second validations, executing the script on the computer appliance.

23. A non-transitory computer-readable medium having stored thereon program instructions executable by a processor which, when executed, cause the processor to perform:
   obtaining a script payload from a requesting entity via an interface of the computer appliance, the script payload comprising the script and script security data;
   obtaining multiple authentication factors for the script from the script and the script security data, the multiple authentication factors comprising at least some nested authentication factors and including an origin identifier, a requester identifier associated with the requesting entity, and a target appliance identifier, wherein a first one of the authentication factors is encapsulated within a second one of the authentication factors;
   performing a first validation to authenticate the script and the first authentication factor based on the second authentication factor and to generate a validated first authentication factor;
   performing a second validation to authenticate the script based on the validated first authentication factor; and
   responsive to the script being authenticated by the first and second validations, executing the script on the computer appliance.

24. The system of claim 22, wherein said performing the first validation comprises authenticating the script based on an origin identifier as the second authentication factor.

25. The system of claim 22, wherein said performing the second validation comprises authenticating the script based on a requestor identifier as the first authentication factor.

26. The system of claim 22, wherein said performing the first validation further authenticates an additional authentication factor, encapsulated within the second authentication factor, and generates a validated additional authentication factor, and wherein said performing the second validation further authenticates the script based on the validated additional authentication factor.

27. The system of claim 22, comprising performing an additional validation to authenticate the script and the second authentication factor, encapsulated within a third authentication factor, based on the third authentication factor and to generate a validated second authentication factor, wherein said performing the first validation is based on the validated second authentication factor, wherein:
   the third authentication factor, on which the additional validation is based, is a target appliance identifier;
   the second authentication factor, on which the first validation is based, is an origin identifier;
   the second authentication factor, on which the first validation is based, is a requestor identifier.

28. The system of claim 22, wherein said performing the second validation further authenticates a third authentication factor, encapsulated within the first authentication factor, to generate a validated third authentication factor, and comprising performing an additional validation to authenticate the script based on the validated third authentication factor.

29. The system of claim 22, wherein said performing the first validation to authenticate of the script comprises:
   obtaining a digital signature indicative of an origin identifier; and
   validating the digital signature based on the second authentication factor to generate the validated first authentication factor.

30. The system of claim 22, wherein said performing the second validation comprises obtaining an authentication token associated with the requesting entity.

31. The system of claim 22, wherein said performing the second validation comprises:

determining a requester class to which the requesting entity belongs; and determining whether the requester class is authorized to request execution of the script.

32. The system of claim 22, wherein said performing the second validation to authenticate the script comprises determining whether an appliance identifier associated with a computer appliance corresponds to a target appliance identifier obtained from the script security data.

33. The system of claim 22, wherein said performing the second validation to authenticate the script comprises:

determining, based on a target appliance identifier, at least one approved appliance class for which execution of the script is authorized; and determining whether the computer appliance belongs to one of the at least one approved appliance class based on an appliance identifier associated with the computer appliance.

34. The system of claim 22, wherein said obtaining the script payload comprises obtaining the script payload over a network via a network interface of the computer appliance.

35. The system of claim 22, wherein said obtaining the script payload comprises obtaining the script payload from a removable media device couplable to the computer appliance via a media interface of the computer appliance.

36. The system of claim 22, comprising responsive to said executing the script on the computer appliance, storing a record of execution of the script within a database.

\* \* \* \* \*